Figure 6:
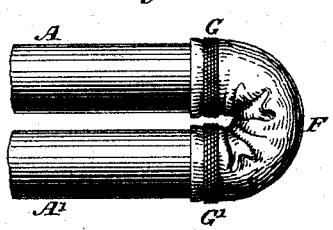

(No Model.) 2 Sheets—Sheet 1.
F. B. CROCKER.
UNDERGROUND ELECTRICAL CONDUCTOR.
No. 355,063. Patented Dec. 28, 1886.
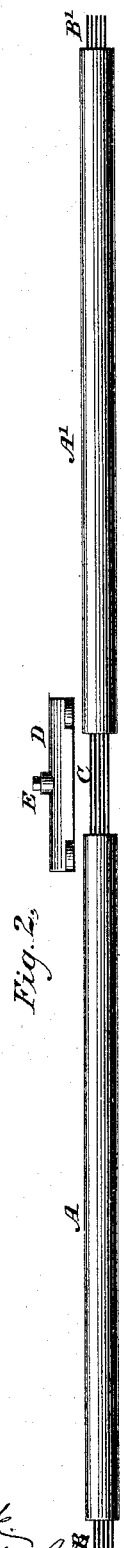
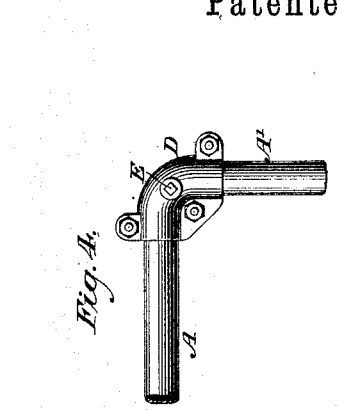
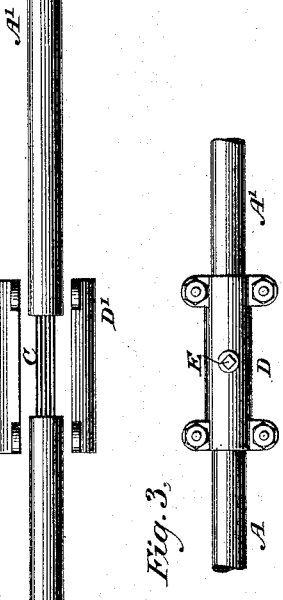
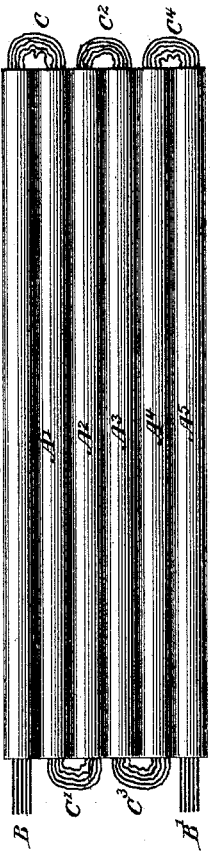
Witnesses
Geo. W. Breck
Carrie E. Ashley
Inventor
Francis B. Crocker
By his Attorneys
Curtis & Crocker.

(No Model.) 2 Sheets—Sheet 2.

F. B. CROCKER.
UNDERGROUND ELECTRICAL CONDUCTOR.

No. 355,063. Patented Dec. 28, 1886.

Witnesses
Geo. W. Breck.
Carrie E. Ashley.

Inventor
Francis B. Crocker
By his Attorneys
Curtis & Crocker.

UNITED STATES PATENT OFFICE.

FRANCIS B. CROCKER, OF NEW YORK, N. Y., ASSIGNOR TO THE EDISON MACHINE WORKS, OF SAME PLACE.

UNDERGROUND ELECTRICAL CONDUCTOR.

SPECIFICATION forming part of Letters Patent No. 355,063, dated December 28, 1886

Application filed April 17, 1885. Serial No. 102,533. (No model.)

*To all whom it may concern:*

Be it known that I, FRANCIS B. CROCKER, of New York, in the county and State of New York, have invented certain new and useful Improvements in Underground Electrical Conductors, of which the following is a specification.

Underground conductors for telegraph, telephone, electric light, and other electrical purposes consist, essentially, of one or more wires insulated electrically, and contained or inclosed in a conduit, pipe, or covering, which protects them from mechanical injury. There are several classes of underground conductors commonly employed.

First. Conduits in which the wires are supported and kept apart by various arrangements of troughs, shelves, brackets, &c.; but these conduits are very large and expensive, compared with the number of wires they contain, and great trouble arises from water getting into them, which difficulty it is almost impossible, with this construction, to avoid.

Second. Underground conductors in which a number of separate insulated wires, or cable of insulated wires, are laid in pipes; but in this case it is very difficult to draw the wires or cable through the pipes, and the insulation is very apt to be chafed off or injured, and for these reasons it is necessary to use a pipe considerably larger than that actually required to contain the wires or cable. The space left between the wires and the pipe is very liable to become filled with water, and for this reason the insulation of the wires must be very perfect.

Third. Underground conductors which consist of a pipe or tube, usually of iron, containing the wires, and having all the remaining spaces and interstices completely filled with an insulating compound, which is melted and forced in. This form of underground conductor, known as "electric tube," is manufactured in lengths in the factory, where machinery and other facilities are available, and consequently it can be made much more perfectly and cheaply in this way, and a much greater number of wires can be put in a pipe of a given size than is possible in the street, where the work of drawing the wires through the pipes, &c., is extremely difficult. Moreover, in this form of conductor, since the spaces are entirely filled with insulating compound, all moisture is absolutely excluded, and this is practically about the only way to accomplish this result; but this form of conductor being made in separate disconnected lengths or sections, it is necessary when these lengths are laid to unite the wires as well as the pipes at each joint, and the trouble and time required to make these joints and solder the corresponding wires together every thirty or forty feet (which is the maximum length of section that can be conveniently used) is very considerable, particularly when there are a large number of wires.

The object of my invention is to avoid as far as possible the trouble of making these connections, and at the same time to produce an underground electrical conductor which is simple and cheap to manufacture and lay, and is free from the serious difficulties which are met with in most conductors.

Figure 7:
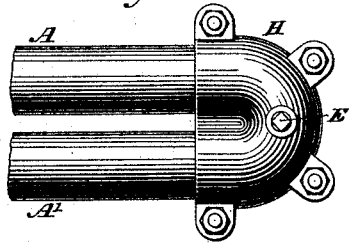
Figure 8:
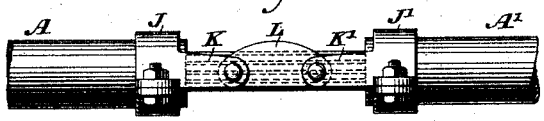
Figure 9:
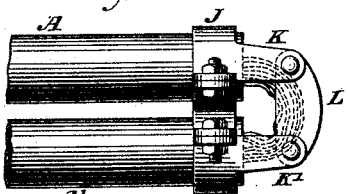
Figure 10:
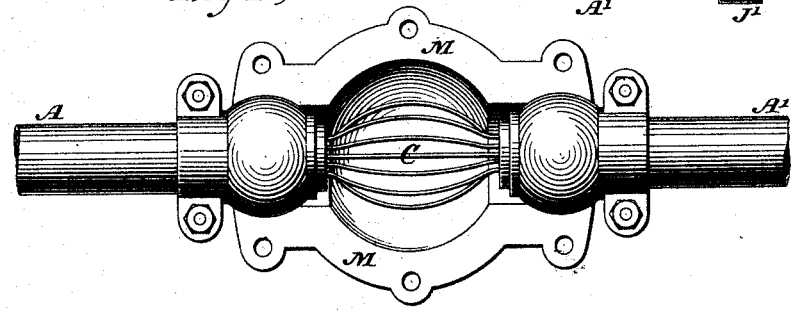
Figure 11:
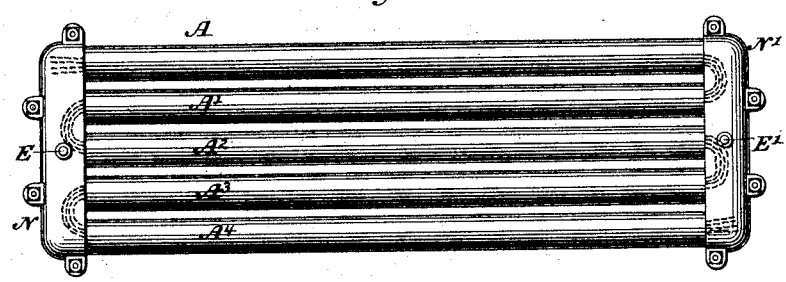
Figure 12:
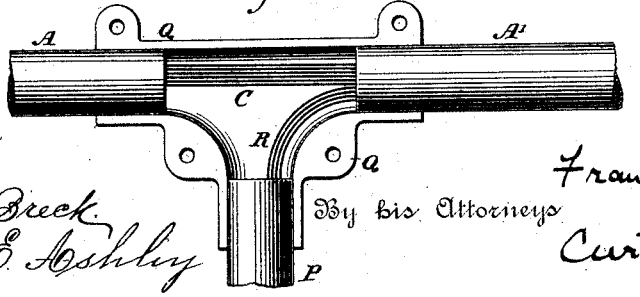

In the accompanying drawings, which illustrate my invention, Figure 1 shows two lengths or sections of underground conductor or electric tube folded together for storage or transportation. Fig. 2 represents the same two lengths of tube unfolded or straightened out to be laid in the ground. Fig. 3 is a plan view showing the tubes united by a coupling-box. Fig. 4 is a plan view of two lengths of tube joined at right angles. Fig. 5 represents a number of lengths stacked together. Fig. 6 shows a form of temporary covering which I employ to protect the wire where it passes from one length of tube to another. Fig. 7 shows another form of protection. Fig. 8 shows a hinged or linked protecting device. Fig. 9 shows the same device folded up. Fig. 10 shows a form of permanent junction or coupling. Fig. 11 represents a number of lengths folded up and held together by boxes. Fig. 12 shows a T-joint or branch connection.

Similar letters of reference indicate similar parts in all the figures.

In Fig. 1, A and A' are tubes or pipes of iron or other suitable material. Through these tubes a number of properly-insulated wires are drawn. These wires are continuous with respect to both the tubes—that is, they extend from B through the tube A, then across at c to the tube A' and through it to B'. The conductor is made up or manufactured in this form in the shop or factory, and is folded together in order to store or transport it, as shown in Fig. 1. When the conductor is brought to the place where it is to be laid it is unfolded, as shown in Fig. 2, and placed in the trench or other place prepared to receive it, and a suitable split coupling, D, or its equivalent, is put on, in order to connect the tubes A and A' together and protect the portion c of the wires where they pass from one tube to the other. The coupling D is shown in plan in Fig. 3 bolted to the tubes.

Fig. 4 shows a right-angle joint or elbow employed in turning a corner. It is of course evident that any acute or obtuse angle joint may be made in a similar manner.

It will be seen that the split coupling which I employ enables the tubes to be connected when they are at any angle with respect to each other, and without screwing the tubes together and thereby twisting the wires; and the coupling may be easily removed at any time for testing or making branch connections, &c., without moving or disturbing the tube in any way.

Fig. 5 shows the case where six lengths or sections of tube are made in one set, and the wires are represented as extending continuously through all the six lengths of tube. The lengths are shown in this case, Fig. 5, folded or stacked together. It is obvious that in the same way any other number of lengths may be made in one set, the number being only limited by convenience of manipulation, &c., and will be determined by the circumstances in each particular case.

Fig. 6 shows a form of temporary covering or guard which I employ to protect the portion c, Fig. 1, of the wires where they are exposed in passing from one length of tube to another. In this case the guard consists of a piece, F, of rubber hose or oiled canvas, which, in the case of the rubber hose, is slipped over the tubes, and in the case of the oiled canvas is sewed on and is lashed to the tubes by cords G G, as shown in Fig. 6. These guards should be put on before the conductors leave the shop, and they protect the wires at the joints from mechanical injury, rain, &c., and hold the tubes together and relieve the wires from strain while the conductors are being conveyed to where they are to be laid, and these flexible guards also serve as hinges, so to speak, when the sections are folded or unfolded. These guards are of course taken off before the couplings D, Fig. 2, are put on. Fig. 7 shows a form of guard made of cast-iron, which is bolted to the tubes, like the couplings shown in Figs. 2, 3, and 4. This form of guard is of course inflexible, and can only be used when the sections are folded up. It must be taken off before they can be unfolded; but it has the advantage of being very strong, and is applicable where the conductors are subjected to rough handling in transportation.

Figs. 8 and 9 show a form of hinged guard made of wrought-iron, and consisting of collars J J', bolted to the tubes and having extensions K K', connected by a link, L, the link being pivoted on the projections, as shown. There is, of course, the same arrangement of projections and link on the other side, which cannot be seen in the drawings. Fig. 8 shows the guard straightened out, and Fig. 9 shows the same folded up. This form of guard, like that shown in Fig. 6, serves both as a guard and as a flexible connection or hinge. It will be understood that it is essential to use these guards.

Fig. 10 illustrates an improved form of coupling-box, which is not my invention, being described in Letters Patent to J. Kruesi, No. 275,776, April 10, 1883, but which is applicable to my conductor. This form of junction is provided with universal joints, as shown, which permit the tubes to move or bend a few degrees in any direction, and thus adapt themselves to the settling of the ground, &c. The enlargement of the box shown in Fig. 10 allows the wires c to be spread apart, as represented, so that they are accessible for testing, making branch connections, &c., after they are laid, the box being taken off for this purpose and put on again after the test is made; or, in case of a branch connection or "service," the box M is replaced by another form, to be hereinafter more fully described. The enlarged or globular form of junction-box may, if desired, be made in simple form without the universal joints shown in Fig. 10. In Fig. 11 a number of sections of my conductor are represented folded up and protected by guard-boxes N and N'. These guards are made of cast-iron, and are similar to that shown in Fig. 7, which I have already described, the only difference being that they hold a number of sections instead of only two. This arrangement, Fig. 11, by which a number of sections of my conductor are held firmly together, as well as protected, is an excellent form in which to transport it.

Fig. 12 illustrates my invention applied to the case of a branch connection. A and A' are the main tubes. P is the branch tube. Q is the coupling-box. A portion, R, of the wires which come out of the main tube A' turn and enter the branch tube P, and the rest of the wires, C, pass on through the main tube A. Thus the wires which pass through the tube A' divide and continue on, according to my invention, through the tubes A and P, and do not require to be connected when the tubes are laid. The sections are manufactured and are folded together for transportation in precisely the same way when there are branch connections as when the joints are of the simple kind shown in Fig. 2. Other branch connections and divisions of the wires into two, three, or even more parts may be made in a similar manner. The junction shown in Fig.

12 may be employed wherever it is desired to take off a service—for example, to connect a subscriber in the case of telephone-lines.

In the drawings I have, for the sake of convenience, represented the tubes as containing only a few wires; but as a matter of fact the tubes may often contain several hundred wires, and my invention is especially applicable where there are a great many—in fact, the larger the number of wires the greater the advantage.

My invention is not confined to the use of any particular form of insulation. Any of the well-known kinds of insulated wire may be employed. For example, wires covered with gutta-percha or with any other insulating material or compound are well adapted to the purpose, and many of the commonly-employed methods of wrapping wires or otherwise insulating or separating them are applicable to my conductor; but the method of insulation which I prefer to use is that employed in making the electric tubes, to which I have already referred in the first part of this specification. To this end the proper number of wires insulated with the common cotton covering are drawn through two or more lengths of tube. In order to keep the wires away from the sides of the tube, a spiral winding of rope around the wires as a whole is employed. The remaining spaces and the interstices between the wires are then completely filled with some suitable insulating compound, which is melted and forced into the tubes under pressure. For this purpose the boxes H, Fig. 7, or N N', Fig. 3, or ones similar to them, are bolted on the ends of the tubes to be filled. The screw-plugs E are taken out and pipes are screwed in, through which the melted compound is forced into the tubes. The boxes H or N are then taken off and the compound is melted off the wires where they pass from one tube to another. The tubes thus made are handled and laid in the manner I have already fully described. After the tubes are laid and the coupling-boxes D M G, Figs. 3, 4, 10, and 12, are put on, said boxes should be filled with the same compound with which the tubes are filled, the compound being melted and poured in through the hole E, which is then closed with a screw-plug.

It is of course necessary at the end of each set of lengths to connect the wires of that set to those of the next set of lengths, and so on. These connections may be made as they are now made in the present form of electric tube. My invention does not entirely avoid the necessity of connecting the wires. It merely saves the trouble of making so many joints, the saving depending of course upon the number of lengths of tube in each set, as I have already stated.

I employ the term "continuous" in this specification and in the following claims to express the fact, not that the wires are endless or without joints, but that they are continuous with respect to or extend through two or more lengths of tube.

Having now described my invention, what I claim, and desire to secure by Letters Patent, is—

1. The combination of two or more sections or lengths of pipe, a number of wires or conductors extending continuously through said sections of pipe, means for insulating said wires, the whole being capable of being folded for transportation, and split couplings by which the sections of pipe are connected when they are unfolded and laid, substantially as described.

2. The combination of two or more lengths of pipe, a number of wires or conductors extending continuously through said pipes, and guards which fit upon the ends of said pipes when they are folded together, protect the wires where they pass from one pipe to another, and hold the pipes together during transportation, substantially as described.

3. The combination of two or more lengths of pipe, a number of wires or conductors extending continuously through said pipes, and flexible guards which protect the wires and serve as hinges when the pipes are folded or unfolded, substantially as described.

FRANCIS B. CROCKER.

Witnesses:
W. S. LEWIS,
W. H. SIEGMAN.